INVENTORS:
JOACHIM GREINER, FRIEDRICH KRONES.

United States Patent Office 3,435,336
Patented Mar. 25, 1969

3,435,336
MAGNETOGRAPHIC TESTING WITH RECORDING LAYER HAVING ORIENTED MAGNETIZABLE CRYSTALS
Joachim Greiner and Friedrich Krones, Leverkusen, Germany, assignors to Agfa-Gevaert Aktiengesellschaft, Leverkusen, Germany, a corporation of Germany
Filed Dec. 3, 1965, Ser. No. 511,889
Claims priority, application Germany, Dec. 8, 1964,
A 47,812
Int. Cl. G01r *33/12*
U.S. Cl. 324—37                             2 Claims

ABSTRACT OF THE DISCLOSURE

This invention relates to an improvement in the known magnetographic process by using a magnetizable foil, e.g. in the form of a tape, which contains magnetizable pigments having a preferential magnetic axis perpendicular to the surface of the magnetizable foil.

---

One of the most modern methods of testing materials without damaging them is the well known magnetographic process. In this process the surface of the workpiece to be tested is covered with a magnetizable foil. The scatter field produced at the fault when the sample being tested is magnetized, is reproduced on this magnetizable foil and is then scanned and indicated by the known processes of the magnetic recording technique.

The known magnetic storage tapes which consist either of a magnetizable layer arranged on a suitable support or, in the form of the so-called mass tapes, only of a self-supporting magnetizable layer, do not satisfy the requirements of this process, in particular with regard to their magnetic properties. The special features of the magnetographic process require recording members with unusual qualities. From a magnetic point of view, this is attributable to the unusually small intensity of the scatter fields of the faults that have to be measured. For example more deeply lying faults or discontinuities are almost impossible to measure with the usual tapes, but their measurement is just as important as the measurement of surface discontinuities such as cracks or tears.

Another difficulty in detecting the areas of disturbance by the magnetographic process is due to the following effects:

In order to obtain an effective scatter field from a fine crack in the surface of a workpiece being tested, the workpiece must be magnetized as accurately as possible parallel to its surface. The magnetic field saturating the workpiece also affects the magnetizable layer placed on the workpiece and may in some cases saturate it. This magnetization usually impairs the quality of reproduction of the fault.

In addition, the workpieces to be tested also are subjected to magnetic fluctuations due to surface irregularities and internal tensions. These fluctuations extend over a much wider area than cracks and do not impair the useful qualities of the workpiece, but due to their field component, which extends parallel to the surface, they produce a high level of interference which makes the detection of cracks more difficult.

It is among the objects of the present invention to provide materials and methods for detecting faults or discontinuities in magnetizable metal workpieces by magnetographic processes.

We now have found that the magnetographic process can be improved if the measurement of the magnetic stray fields of the faults is performed with magnetic recording members having acicular magnetizable particles which are orientated perpendicular to its surface or in other words the particles have a magnetic axis of preference in that direction.

As a result of this, the magnetic field component perpendicular to the surface of the workpiece, which is strong in any case in the vicinity of faults, acts under particularly favourable conditions on the foil that is to be magnetized. This field component produces a high remanent magnet magnetization of the magnetizable layer. The effect of the magnetic field components directed parallel to the surface of the workpiece, is thus strongly attenuated and therefore hardly produces any remanent magnetization of the magnetizable layer. The level of noise disturbance drops.

The invention as described in detail will be more fully understood by the following description with joint reference to the attached drawings, in which.

Figure 1:
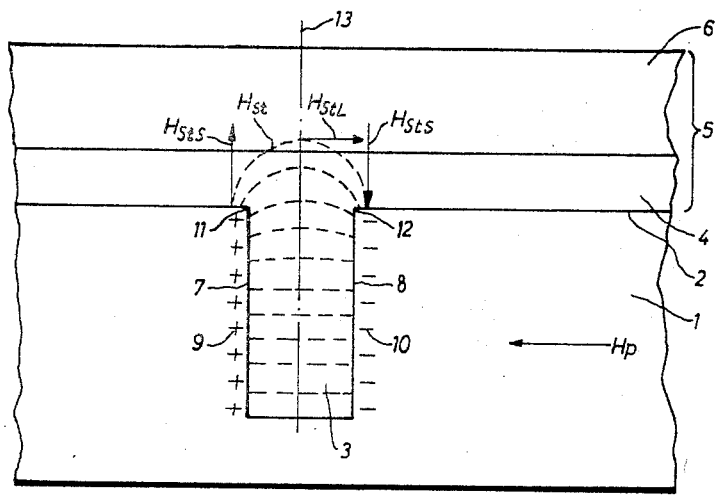
FIGURE 1 illustrates the action of the magnetic stray field of the fault.

FIGURE 1 shows the workpiece 1 which contains the fault or discontinuity 3 for instance a crack. The surface 2 of the workpiece is placed in contact with the magnetizable layer 4 of the magnetic recording member 5. The magnetizable layer is supported by carrier 6. The magnetic field $H_P$ which is generated within the workpiece produces the positive and negative magnetic poles at the side walls of the fault 3. Inside the crack the magnetic field lines are parallel to the surface of the workpiece and perpendicular to the side walls of the crack. The field lines $H_{St}$ of the magnetic stray field of the crack in the surface of the workpiece extend outside the workpiece. At the edge portions 11 and 12 of the crack the field component $H_{Sts}$—with field lines perpendicular to the surface of the workpiece—is stronger than the field component $H_{StL}$ around the axis of symmetry 13. The field lines of the stray field component $H_{StL}$ extend parallel to the surface of the workpiece.

Since the tangential component of the magnetic field $H_P$ extends into elements which are in contact with the magnetized workpiece, the field $H_P$ also magnetizes the magnetizable layer 4. In certain cases this might even yield magnetic saturation of the magnetizable layer. This, however, deleteriously affects the magnetic reproduction of the fault in the magnetizable layer. The magnetization of the magnetizable layer by the tangential component of the field $H_P$ is prevented or at least considerably reduced in the process of the present invention.

Figure 2:
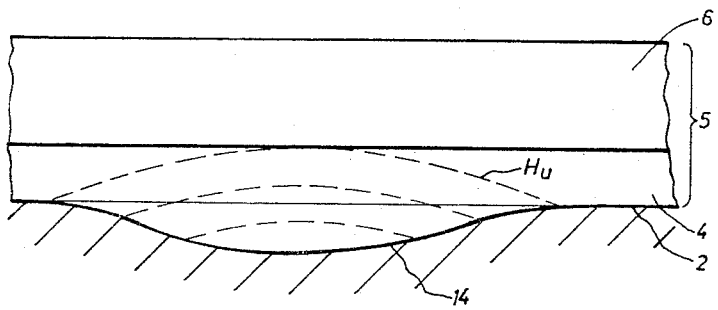
FIGURE 2 shows the action of irregularities in the surface of the workpiece which do not impair the utility of the workpiece but which are disturbing to the magnetographic process.

FIGURE 2 illustrates the action of the magnetic field $H_U$ of an irregularity 14 on the magnetizable layer 4. The field lines of the magnetic field $H_U$ are essentially parallel to the surface of the workpiece. The noise level produced by magnetic field $H_U$ considerably impairs the detection of the faults if a conventional magnetizable layer is used.

The disadvantages described hereinbefore are obviated in the process of the present invention, since the magnetizable layer utilized preferably records the field components $H_{Sts}$ as demonstrated in FIGURE 1.

Magnetic recording members having magnetizable layers which contain acicular magnetizable particles oriented perpendicular to the surface of the layer can be manufactured according to common practice. For preparation of the recording member the acicular ferromagnetic particles are first dispersed in a solution of the binding agent for the magnetizable layer. The resulting dispersion is applied onto a suitable support. While the binder remains sufficiently fluid to allow motion of the magnetizable particles the coated tape is passed through a magnetic field the field lines of which are perpendicular to the surface of the coated layer, to align the ferromagnetic particles in the binding agent perpendicular to the surface of the layer. Thereafter the particles are held in such oriented position, as the coating hardens by the residual induced forces. The oriented ferromagnetic particles are immobile in the dried or hardened layer. Suitable processes are described in British Patent No. 725,872 or Austrian Patent No. 224,357.

According to a preferred embodiment the orienting magnetic field is a substantially homogeneous one. The magnetic field strength perpendicular to the surface of the coating should be at least 1000 oe. The field component ($H_E$) parallel to the surface of the coating should be as low as possible but must not be higher than the saturation magnetization $M_s$ of the coating.

The magnetizable particles are aligned and their ratio of remanence $B_R$ to saturation $B_S$ is between 0.70 and 0.95. That means the remanence in the direction of orientation is between 70 and 95% of saturation.

Suitable supports for the magnetizable layer include films or foils of polyvinylchloride, polyvinyl fluoride, cellulose acetate, polycarbonates especially of bishydroxyphenyl alkanes or preferably polyethyleneterephthalate polyesters.

In the preparation of the magnetizable layers there may be employed as binding agents for instance, plasticized cellulose esters and ethers, polyvinyl resins such as polyvinylchloride, copolymers of vinylchloride and vinylacetate, polyvinylether, e.g., polyvinylbutylether or polyvinylisobutylether, rubbery butadiene-acrylonitrile copolymers or chlorinated rubbers, self-setting or self-polymerizing binders such as polyurethanes, or blends of the polymeric products referred to hereinbefore. Suitable binders are described, for example, in British Patent No. 979,527, in Belgian Patent No. 651,612 or in German patent application A 47,299 now published as Ausligeachrift 1,272,017.

As ferromagnetic particles can be used acicular γ-ferric oxide or tetragonal chromium dioxide as described, for example, in Belgian Patent No. 650,936 or British Patent No. 877,754 and 878,421.

The concentration of the ferromagnetic particles in the magnetizable layer can vary within wide limits. Preferred are concentrations of between 5–30% especially about 10 percent by volume. These concentrations are below the usual concentration in conventional magnetizable layers. The magnetizable layer has preferably a thickness of between 20–50 microns.

The invention is illustrated further by the following example.

EXAMPLE 1

300 g. of acicular chromium dioxide modified with tellurium and having a remanence of about 400 G/g. and a coercivity of 300 oe. are ground on a suitable grinder to an average particle size of at least $0.8\mu$ in a solution of 71.5 g. of a hydroxyl-group-containing polyester of 3 mols of adipic acid, 2 mols of 1,3-butylene glycol and 2 mols of hexanetriol, and of 23.6 g. of a copolymer of polyvinyl chloride and polyvinyl acetate in the ratio of 85:15 in 565 ml. of ethyl acetate, 175 ml. of butyl acetate and 87 ml. of cyclohexanone.

The preparation of the chromium dioxide is described in Belgian Patent No. 650,936.

After grinding, the dispersion is filtered. 63 ml. of a hexamethylene diisocyanate which has been partly reacted with hexane triol are then added. A polyester foil $25\mu$ in thickness is then coated with this dispersion which is then dried. The resulting layer contains 20 g./m.$^2$ of the magnetizable pigment. During the coating process process the magnetizable particles were oriented by subjecting the layer while the binding agent is still fluid to an alternating magnetic field (50 c.p.s.) perpendicular to the surface of the coating. The field strength of the magnetic field perpendicular to the surface was above 1000 oe. The field component parallel to the surface of the coating was below 200 oe. The $B_R/B_S$-value of the oriented layer is about 0.85. The binding agent is then crosslinked by heating to a suitable temperature of about 120° C.

An iron rail of 20 x 5 mm. in cross section and of length about 1.50 metres has a fault in the form of a saw cut situated in the centre and about 1 mm. in depth. The above magnetic recording member was placed with its magnetizable layer in contact with the iron rail. The magnetizable layer had a thickness of about $22\mu$.

The iron rail is magnetized by means of two ceramic hard magnets of dimensions 50 x 5 x 15 mm.$^3$ which are situated at a distance apart of about 55 mm. They are passed over the rail and the tape at a distance of about 5 mm. from the tape, a field strength of about 100 oe. acting along the surface in the centre of the permanent magnet. After magnetization, the magnetic tape is glued together to form a loop and it is played off a magnetic tape recorder (e.g., at a tape speed 9 cm. per second). The voltage of the playback head is increased and is reproduced through a loud speaker, a tube voltmeter or a registration instrument. The tube voltmeter employed indicated a level of disturbance of 2–4 mv. At the point where the gap was situated, it gave a deflection indicating 8 mv.

If a conventional magnetic recording member such as described for example, in British Patent No. 979,527 is employed, the level of disturbance is about 6 mv.

We claim:

1. A magnetographic method of nondestructive testing of magnetizable metal articles for faults by measuring the magnetic scatter field of the fault of the magnetized metal article to be tested, the steps of placing on a surface of the article to be tested a magnetic recording member comprising a magnetizable layer which contains an effective amount of acicular ferromagnetic particles which are physically oriented perpendicular to the surface of the magnetizable layer, magnetizing the article with flux directed essentially parallel to the surface of the article to be tested, to cause faults therein to generate scatter field flux including flux components perpendicular to said surface, said perpendicular flux components effectively magnetizing said perpendicular particles while other flux components are less effective in magnetizing said particles to diminish the level of recorded background disturbance, and analyzing the layer for recorded fault indications.

2. The method of claim 1, wherein the magnetizable layer has a thickness of between 20 and 50 microns and wherein the magnetizable layer contains between 5 and 30 percent by volume of the ferromagnetic particles based on the total volume of the magnetizable layer.

References Cited

UNITED STATES PATENTS 2,764,733    9/1956    De Forest _____ 324—38
3,221,315    11/1965    Brown et al. _____ 324—43

RUDOLPH V. POLINEC, *Primary Examiner.*

R. J. CORCORAN, *Assistant Examiner.*